United States Patent [19]
Ito et al.

[11] Patent Number: 5,768,251
[45] Date of Patent: Jun. 16, 1998

[54] OPTICAL RECORDING/REPRODUCING APPARATUS FOR HIGH DENSITY MULTILAYERED DISKS

[75] Inventors: Noboru Ito, Hirakata; Shinichi Tanaka, Kyoto; Sadao Mizuno, Ibaraki; Kenichi Nishiuchi, Moriguchi, all of Japan

[73] Assignee: Matsushita Electric Industrial Co., Ltd., Osaka-fu, Japan

[21] Appl. No.: 681,500

[22] Filed: Jul. 23, 1996

Related U.S. Application Data

[62] Division of Ser. No. 384,459, Feb. 2, 1995, Pat. No. 5,563,873, which is a division of Ser. No. 157,398, Nov. 26, 1993, abandoned.

[30] Foreign Application Priority Data

Nov. 26, 1992 [JP] Japan ................... 4-316831
Jun. 25, 1993 [JP] Japan ................... 5-154701

[51] Int. Cl.$^6$ .................................................. G11B 7/24
[52] U.S. Cl. ................... 369/275.1; 369/286; 369/116
[58] Field of Search ........................ 369/275.1, 275.3, 369/275.2, 275.4, 13, 94, 286, 283, 288, 110, 107, 112, 100, 44.12

[56] References Cited

U.S. PATENT DOCUMENTS

| | | |
|---|---|---|
| 4,450,553 | 5/1984 | Holster . |
| 5,045,373 | 9/1991 | Sens ............................ 369/288 X |
| 5,121,376 | 6/1992 | Kuder ......................... 369/286 X |
| 5,126,996 | 6/1992 | Maeda ........................ 369/291 |
| 5,187,703 | 2/1993 | Katayama et al. ........ 369/275.1 |
| 5,410,534 | 4/1995 | Nagata et al. ............. 369/275.4 |
| 5,493,561 | 2/1996 | Nishiuchi et al. ........ 369/275.1 |
| 5,563,873 | 10/1996 | Ito et al. ................... 369/286 |

FOREIGN PATENT DOCUMENTS 2017379  10/1979  United Kingdom .

*Primary Examiner*—Ali Neyzari
*Attorney, Agent, or Firm*—Wenderoth, Lind & Ponack

[57] ABSTRACT

A multi-layer optical disk includes a plurality of recording layers and each recording layer is composed of a first layer and a second layer having respective transmission indices of T1A and T2A with respect to a disk irradiation beam intensity A and having respective transmission indices of T1B and T2B with respect to a disk irradiation beam intensity B such that $T1A \times T2A = T1B \times T2B$. The interval between one recording layer and another recording layer is at least 10 times as long as a wavelength of an optical source providing the disk irradiation beams. Furthermore, the first and second layers may have respective thicknesses of H1 and H2 and respective refractive indices of N1A and N2A with respect to a disk irradiation beam intensity A and have respective refractive indices of N1B and N2B with respect to an irradiation beam intensity B such that $N1A \times H1 + N2A \times H2 = N1B \times H1 + N2B \times H2$.

8 Claims, 14 Drawing Sheets

1

OPTICAL RECORDING/REPRODUCING APPARATUS FOR HIGH DENSITY MULTILAYERED DISKS

This application is a Divisional of Ser. No. 08/384,459, filed Feb. 2, 1995 now U.S. Pat. No. 5,563,873; which is in turn a Divisional of now abandoned Ser. No. 08/157,398, filed Nov. 26, 1993

BACKGROUND OF THE INVENTION

The present invention generally relates to optical disk recording media, and more particularly, to high density optical discs for use with an optical recording/reproducing apparatus for optically recording or reproducing information.

A conventional optical apparatus will be described with reference to FIG. 17. The irradiation beams of a semiconductor laser 81 are converted into 0 order and primary diffraction beams by a diffraction grid 82, thereafter are reflected by a beam splitter 83, are focused onto a recording layer 80 of an optical disk 85 by an objective lens 84 so as to form an optical spot 86. Optical beams 88 reflected by the optical disk 85 are transmitted through the objective lens 84, and are split by splitter 83 so that the transmitted optical beams 88 enter an optical detector 87. A focus error signal together with a reproducing signal is detected by an astigmation method from an optical detector 87a having four sections. A tracking error signal is obtained by a three-beam method of detecting the optical quantity difference of the previous ± primary diffraction returning beams which become incident to the optical detectors 87b and 87c. The reproducing signal is obtained as a total of the beam reception amount of the optical detector 87a. In such a conventional optical disk apparatus, the recording layer 80 is the only layer on the disk face. The recording capacity increases if the recording layers 80 are laminated in a direction of the thickness of the disk 85. When the recording layers 80 have been laminated, the influences of interfering beams from the recording layers which are not being recorded or reproduced become a problem, thus resulting in difficulties in the lamination of multiple recording layers unless the problem is solved.

In recent years, higher density recording, using shorter wave length beams, narrower tracks or the like have been tried. Furthermore, the recording density can be improved if the density improvement is effected in the vertical direction of the recording face in addition to the improvement within such a recording face, namely, if the number of faces can be increased by the lamination of the recording layers. Such a lamination has not been adopted because of the disadvantage in that there are influences of the reflection and transmission of the beams caused by a layer other than the reproducing/recording layer. Even in the construction of the conventional optical disk apparatus, the number of recording faces provided on the optical disk medium is limited to only one face on each side. The number of recording faces provided with respect to one optical disk medium is therefore two faces at most.

SUMMARY OF THE INVENTION

Accordingly, the present invention has been developed with a view to substantially eliminated the above discussed drawbacks inherent in the prior art and an essential object of the present invention is to provide an improved optical disk construction.

Another important object of the present invention is to provide an optical disk construction for reducing influences from layers other than the reproducing layer so as to improve recording density by lamination.

In accomplishing these and other objects, according to one preferred embodiment of the present invention, there is no primary or other diffraction beam with respect to the transmission beams by the recording pit. This operation enables the reduction of the influences from the layer except for the reproducing layer, thus settling a problem of the lamination construction. There is a wavelength multiplex method as a method of improving high density with a concept similar to that of the present invention. The present invention uses a multi-layer. On the other hand, the wavelength multiplex method includes a step capable of obtaining the reproducing signals independently with respect to the respective wavelengths if a recording operation is effected in a superposed relation with many different wavelengths on a recording material formed with one layer only, and a reproducing operation is effected with a different wavelength, thus enabling the higher density of the using several wavelength portions. A method of using organic coloring matters as a recording material, a chemical hole burning method or the like are studied. In addition, a method of changing the polarization direction of the beams so as to effect recording and reproducing operations is proposed as a multiplex recording method. The present invention can be effected if the wavelength is constant or the polarization direction is constant. This point is clearly different from the above described method.

The optical disk apparatus of the present invention is composed of a beam source, an optical disk where a recording layer and a transparent body are alternately laminated, majority of energies are distributed on 0 order transmission beams of the transmission diffraction means by a pit on the recording layer, an objective lens for focusing the optical beams from the beam source onto the optical disk, and a detecting means for receiving the reflection beams from the optical disk so as to detect the information recorded on the optical disk.

As the present invention can restrain signal mixture from a recording layer which does not become an object of the recording or reproducing operations, the recording layers can be laminated, thus improving the remarkable recording density.

BRIEF DESCRIPTION OF THE DRAWINGS

These and other objects and features of the present invention will become apparent from the following description of the preferred embodiments thereof with reference to the accompanying drawings, in which.

DETAILED DESCRIPTION OF THE INVENTION

Figure 1:
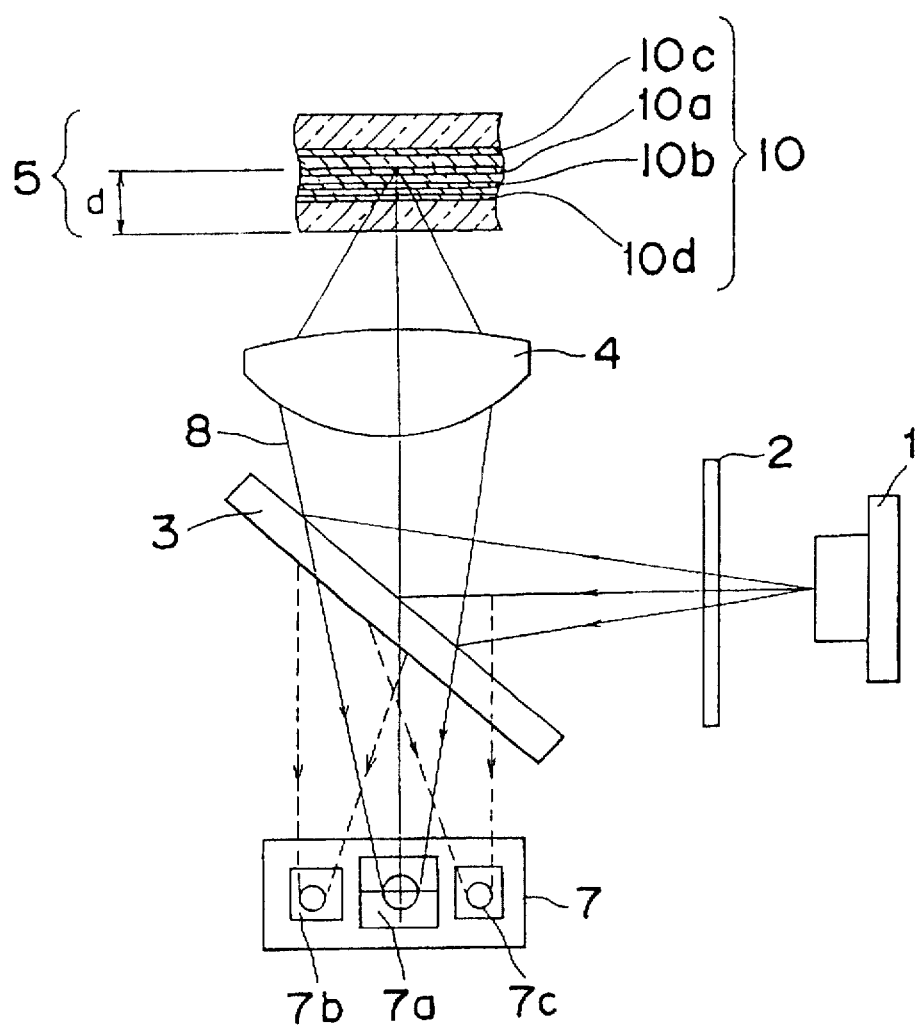
FIG. 1 is a view of an optical disk apparatus in accordance with a first embodiment of the present invention.

Before the description of the present invention proceeds, it is to be noted that like parts are designated by like reference numerals throughout the accompanying drawings.

Figure 3A:
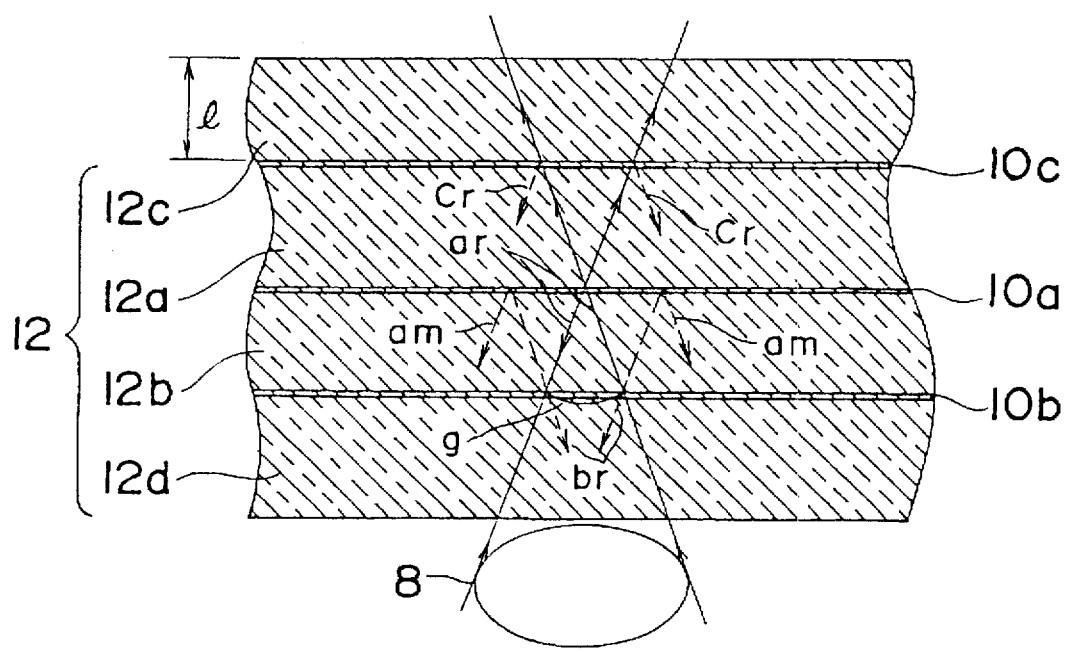
FIGS. 3a and 3b are beam transmission and reflection explanatory views in a multi-layer recording layer.
Figure 3B:
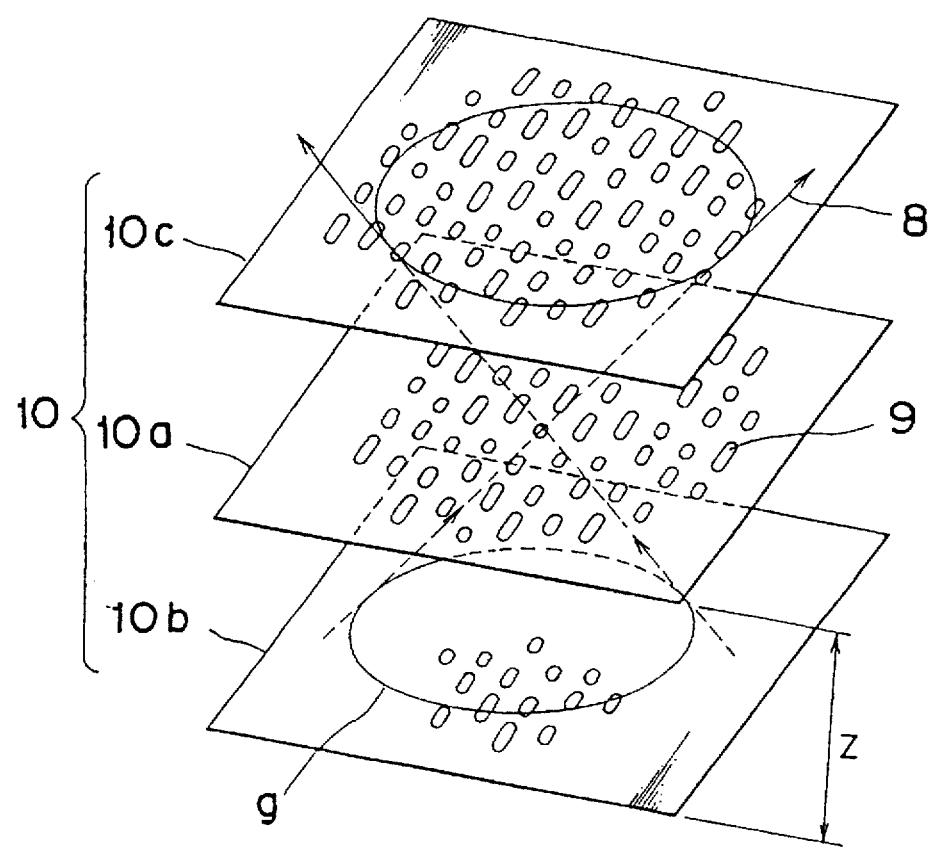

The optical disk apparatus in accordance with an embodiment of the present invention is described hereinafter with reference to the drawings. FIG. 1 shows the construction of an optical disk apparatus in accordance with a first embodiment of the present invention. The optical disk 5 of the present invention is shown by FIGS. 1, 3a and 3b, wherein many recording layers are provided and laminated respectively in some spaced relationship (sufficiently long interval with respect to wavelength). The optical beams 8 transmit through some layers 10b of the recording layer 10, and thereafter are focused into a recording layer 10a to be recorded and reproduced. The optical beams 8 reflected here trace an optical path opposite to an outgoing path and are transmitted through a beam splitter 3 into an optical detector 7.

Figure 2:
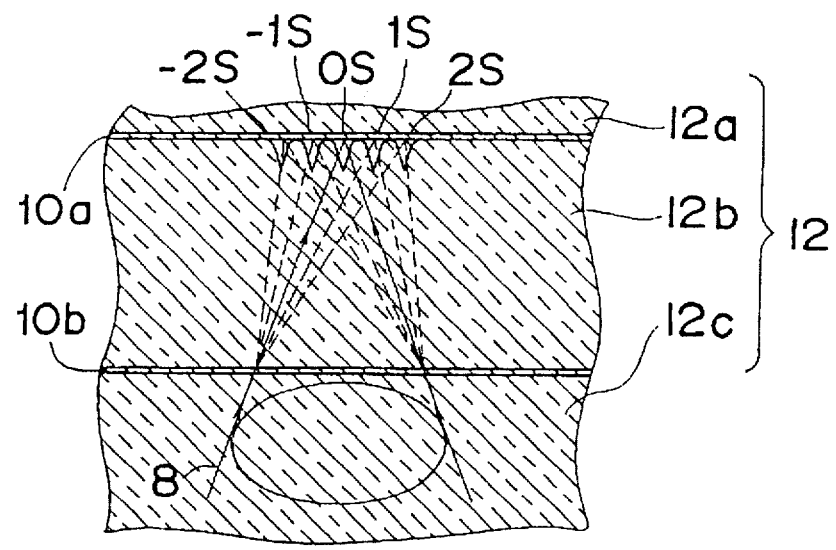
FIG. 2 is a view of a recording pit on a recording layer.

An optical function of the optical disk in the present invention is described hereinafter. In the optical disk 5 of the present invention, one or more primary diffraction beams caused by a recording pit 9 do not occur. The transmitting optical beams become approximately 0 order beam only. The 0 order transmission diffraction beams mean the transmission beams where the variation in a progressing direction is not received by diffraction at the transmission time. Therefore, the signal mixture from the recording layer which does not become an object of the recording and reproducing operations can be reduced, which will be described hereinafter. Harmful influences will be described in a case where one or more primary diffraction beams exist in the transmission beams. A problem is influences of the diffraction beams which have passed through a non-focusing recording layer 10b before a focus shown in FIG. 2 in a case of an outgoing path progressing towards the disk 5. As the recording pit is on a track, it has a function of a diffraction grid where a track interval is a pitch. As shown in FIG. 2, all the diffraction beams form an optical spot 0S by 0 order diffraction beams, an optical spot 1S by the primary order diffraction beams, an optical spot −1S by the -primary order diffraction beam or the like in a condition where all the diffraction beams are focused on a focus recording layer 10a. The primary order optical spots 1S and −1S or the like except for the optical spots 0S irradiate a recording pit located in a position independently of a recording pit to be recorded or reproduced. The reflection beams partially enter the detector so as to be mixed with the desired signals. A reproduction signal of a recording pit which should not be recorded or reproduced is included in the signal. The output becomes large as compared with the original reproducing signal so that it cannot be neglected, because the pit has been reproduced in a focusing condition. It is a condition where simultaneous reproduction is effected with multi-optical spots of 0S, 1S, −1S or the like, which causes a problem in that a signal to be reproduced is buried in the multi spot reproducing signal. In a case where high order diffraction beams exist in the transmission beams, a normal reproducing operation is impossible to effect. In order to effect a normal reproducing operation, it becomes necessary for the higher order diffraction beams not to exist in the transmission beams. Actually it is difficult to completely remove the higher order of diffraction beams. The higher order diffraction beams of one or more primary beams with respect to the 0 order beams are desired to be at least 20% or lower. If the diffraction beams are 1% or lower, no problem is actually caused. A disk in which the higher order beams are 1% or lower can be made.

Other harmful influences will be described hereinafter in conditions where the diffraction beam of a higher order does not exist in the transmission beams.

In the transmission through the recording layer 10, no information of the recording pit of the recording layer 10 is provided, which is similar to no recording pit, thus resulting in no influences due to both the transmission beams in the outgoing path and the transmission beams in the ongoing path.

The reflection beams of the recording layer 10 will be described hereinafter. The reproducing signal in the optical disk is detected as change in the received amount of light by of the detector 7. When an irradiating operation is effected on the recording pit 9 on a recording layer 10a where the optical spot 0S has been focused, the reflection beam 8 is diffracted by the recording pit 9, so that one portion of the diffraction beam of a higher order cannot enter the objective lens 4. The total incident amount of light entering the objective lens 4 is reduced and the optical quantity reduction is detected so that the reproducing signal is obtained. Therefore, the amount of light variation, which is caused by some causes in addition to the light variation described hereinabove, becomes an interference signal. Interference signals by reflection beams br, which are reflected by a recording layer 10b in a defocused condition shown in FIG. 3a and are directed to the objective lens 4, will be taken into consideration. Reflection diffraction is caused by the recording pit 9 on the recording layer 10b so as to cause variations in the incident amount of light entering the objective lens 4, thereby causing interference signals. As shown in a model in FIG. 3b, conditions can be set so that the interval Z of the recording layers 10 may become sufficiently large with respect to the size of the wavelength of the beam and the size of the recording pit 9, and The optical beam 8 becomes sufficiently large as compared with the size of the pit when the optical beams 8 have been irradiating the recording layer 10b, so that the irradiating operation may be effected on many recording pits 9 within a wide range on the recording layer 10b. Even if the number of the pits to be irradiated is slightly varied, it is slight as compared with the total number of irradiated pits. The number of irradiated pits is normally regarded as approximately constant. Since the amount of light entering the objective lens of the reflection beams br of the non-focussed recording layer 10b is normally approximately uniform, the influences upon the detection signal do not substantially become large.

The interval between two adjacent recording layers (e.g.- 10a and 10b or 10b and 10c) is made at least 10 times as long as the wavelength of the light beam generated by the light source 1.

A diameter G of an optical beam 8 to be applied upon the recording layer 10b becomes, $$G = 2L \times NA/\sqrt{1-NA^2}$$
$$= 2 \times 10 \times 0.5 \div \sqrt{1-0.5^2}$$
$$= 12 \mu m$$

where an objective lens NA is 0.5, a track pitch and a pit pitch are 1.6 μm respectively as a standard value, and an interval L between recording layers is 10 μm. Approximately 44 recording pits 9 can be provided within the diameter G circle. Suppose that one portion of the recording pit is varied, and $\frac{1}{44}=2.3\%$ is varied with respect to the whole, which has no large problem in approximately practical use. If the interval L between recording layers is increased, then the value becomes smaller. If the interval is=30 μm, $$2.3 \times (10/30)^2 = 2.3 \times 0.11$$
$$= 0.25\%$$

which hardly becomes a problem.

A supremum of the interval L between recording layers is approximately 0.8 mm in limit, because an effect to be laminated is reduced when the supremum is made excessive.

The influences of the multiplex reflection beams of the reflection beams ar in a focusing condition where a signal should be an original signal is considered. As one example, consider an optical beam am directed to the objective lens 4 after reflection between the recording layers 10b and 10a. Since the optical beams ar are irradiated on the recording layer 10b in a spread condition and thereafter, are irradiated on the recording layer 10a in a further spread condition, substantial influences are not caused on the average as described before. The same thing can be said even about the other multiplex reflection. The beams are transmitted through the focusing recording layer 10a and thereafter are reflected by the non-focusing recording layer 10c. The same thing can be said even about the beams cr directed to the objective lens 4.

If the transmission beams can be made 0 order only as described hereinabove, the influences of the recording pit 9 on the non-focusing recording layer 10b where the optical beams 8 do not become an object of the recording and reproducing can be removed substantially. The recording and reproducing operation can be effected without reception of the influences of the other recording layers by the focusing operation onto the desired recording layer.

Although the optical disk of the present invention passes the 0 order beams only of the pit diffraction beams of the optical beams, the construction of the optical disk for realizing it will be described hereinafter in accordance with a first embodiment of the present invention.

FIG. 1 shows a construction of the optical disk apparatus of the first embodiment, wherein the irradiation beams of the semiconductor laser 1 are converted into 0 order and± primary diffraction beams by a diffraction grid 2, and thereafter are reflected by a beam splitter 3, and are focused onto the recording layer 10 of the optical disk 5 by an objective lens 4 so as to form an optical spot. Optical beams 8 reflected by the optical disk 5 transmit through the objective lens 4, reach splitter 3 so that the transmitted optical beams 8 enter an optical detector 7. A focus error signal together with a reproducing signal is detected by an astigmation method from an optical detector 7a having 4 sections. A tracking error signal is obtained by a three-beam method of detecting the optical quantity difference of the previous± primary diffraction returning beams which become incident to the optical detectors 7b and 7c. The reproduced signal is obtained as a total of the beam reception amount of the optical detector 7a. The optical disk 5 of the present invention is provided with a plurality of recording layers 10 each located in the laminated state apart from the others, for instance, spaced a long enough distance with respect to the wavelength, and the transmitted optical beams 8 pass through some recording layers among the recording layers 10, and, then are focused onto one recording layer 10a to be recorded and reproduced, so that the reflected optical path opposite to the incident path passes though the beam splitter 3 to enter into the detector 7.

First Embodiment of Disk Construction

A first embodiment of optical disk according to the present invention is constructed in such an arrangement where an optical absorber is used as a recording layer 10a–10c will be described with reference to FIG. 4. The transmission index of a recording layer 10 may become constant across the entire face with the thickness of the recording layer 10a–10c being made constant. The refractive index of a transparent body 12a–12d on both sides of the recording layer 10a–10c becomes approximately equal. A recording pit 9 is made by provision of unevenness upon the recording layer 10a–10c. As both are equal in the optical path length comparison from a plane U1 to U2 as shown by the chain lines in FIG. 4, considering the difference in phase between the transmission beam TP of the recording pit 9 portion of the recording layer 10a–10c and the transmission beam TL of a portion free from the recording pit 9, the difference in the phase is not caused. Since the transmission index is also constant, the amplitude of the transmission beam also becomes constant. Although the diffraction of the transmission beams changes by the transmission of either of the amplitude and the phase of the beams, the diffraction of the beams is not caused as changes are not caused in both the TP and TL in this case so that the transmission beams become 0 order only. The transmission beams do not notice the presence and absence of the recording pit as no recording pit 9 is provided. As the optical path length of the reflection beams is different by 2 V, twice the depth of the recording pit 9 in the reflection beams RP of the recording pit 9 and the reflection beams RL of a portion free from the recording pit 9, the phase changes, the primary diffraction beam or more are caused, the recording pit information is included in the diffraction beams so that the pit information can be obtained. A method of making the recording layer 10a–10c comprises the steps of having a metal such as aluminum or the like used as an optical absorber and made into a film thickness where a proper transmission index is obtained, and forming it by evaporating and sputtering operations and so on.

Second Embodiment of Disk Construction

Figure 4:
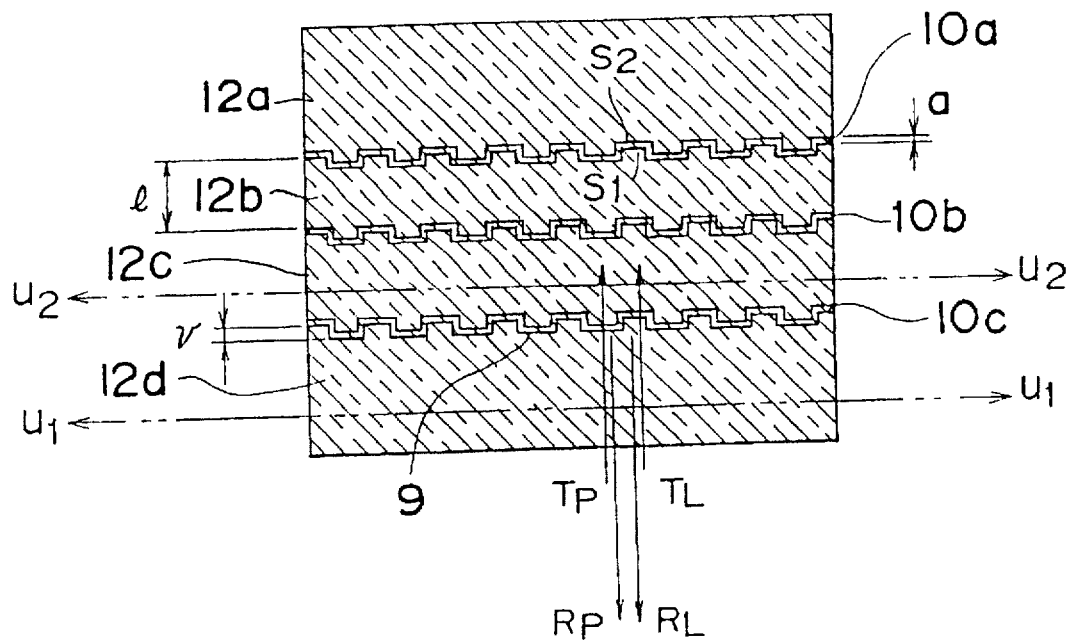
FIG. 4 is a sectional view of an embodiment of a reproduction specific optical disk of the present invention.

An optical disk construction using a dielectric for the recording layer 10a–10c will be likewise described using FIG. 4. The beam reflection to be caused by the difference of the refractive index is caused in the boundaries s1 and s2 of the recording layer 10a–10c and the transparent body 12a–12c. When the thickness a of the recording layer 10a–10c becomes thinner so as to be as low as the approximate wavelength of the light, a relatively large reflection index can be obtained by a principle similar to that of a well known reflection preventive film, multi-layer film filter or the like using the multiplex interference effect of the reflection beams of both the boundaries s1 and s2. The thickness of the recording layer 10a–10c and the refractive index of the transparent body 12a–12d surrounding the recording layer 10a–10c is made constant. The reflection index and transmission index of the dielectric recording layer 10a–10c are related to the refractive index on both the sides of the boundaries S1 and S2. As the portion of the recording pit 9 is the same as the refractive index of a portion where the recording pit 9 is not provided in the present embodiment, the transmission beams TP and TL are the same in both amplitude and phase, so that the diffraction by the recording pit 9 is not caused, and the transmission beams can be 0 order beams only as in the first embodiment, thus obtaining similar effects. Although reflection index and transmission index are determined by the reflective index and the thickness of the recording layer 10a–10c and the transparent body 12a–12d, reflection is caused, if the recording layer 10a–10c and the transparent body 12a–12d are different in reflective index, when the media of both the sides of the recording layer 10a–10c, namely, the reflective index of the transparent body 12a–12d is equal to each other as in the present embodiment. As the recording layer 10a–10c and the transparent body 12a–12d differ more in their refractive index, the reflection index becomes larger. Although approximately 5% or more is desirable in the present invention, the refractive index of the recording layer 10a–10c is desirable to be at least 1.1 times the refractive index of the transparent body 12a–12d or less than or equal to 0.9 times the refractive index. For example, TiO2, ZnS, CeO2, ZrO2 or the like can be used as a dielectric. Although the recording layer 10 includes one layer of dielectric in the above described description, a similar effect is obtained if a plurality of layers are used, thus further enlarging the design freedom.

Third Embodiment of Disk Construction

Figure 5A:
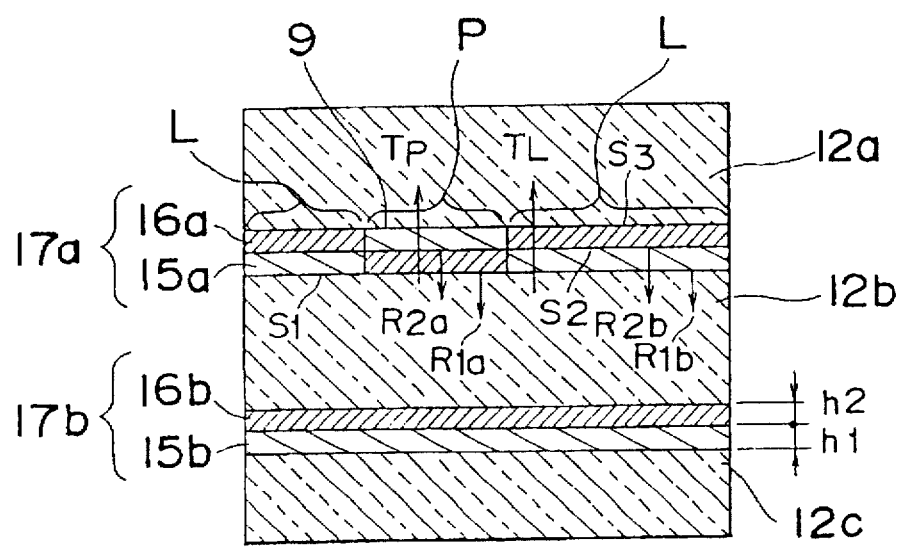
FIGS. 5a and 5b are sectional views of an embodiment of a recording and erasing optical disk of the present invention.

An optical disk construction capable of recording and erasing operations is described hereinafter. Two layers having layers 15 and 16, where a transmission index changes by the difference of the irradiation beam intensity, in proximity are provided as recording layers 17a–17b, as shown in FIG. 5a. Assume that the transmission index of a first layer 15a–15b is T1A, the transmission index of a second layer 16a–16b becomes T2A with respect to an irradiation beam intensity A in the present embodiment, and the transmission index of a first layer 15a–15b is T1B, the transmission index of a second layer 16a–16b is T2B with respect to the other irradiation beam intensity B. When irradiation is effected upon a P portion with irradiation beam intensity A, upon an L portion with irradiation beam intensity B by a disk of such construction, the first and second layers 15a–15b and 16a–16b of the P portion becomes T1A and T2A in transmission index, and the first and second layers 15a–15b and 16a–16b of the L portion become T1B and T2B in transmission index. The reflection in the P portion becomes large on the boundary S1 between the transparent body 12a–12c and the first layer 15a–15b and becomes large by the boundary S2 between the first layer 15a–15b and the second layer 16a–16b in the L portion if the reflection index with respect to the optical irradiation beam intensity A and B in the boundaries S1 and S2 are made R1A, R2A, R1B, and R2B, and, for example, R1A>R2A, and R1B<R2B. In the drawing, the larger reflection index is shown with oblique lines through comparison between the first layer and the second layer. In both the reflection beams R1A and R2B, the height difference H1 in the reflection face of the thickness portion of the first layer 15a–15b is caused in the P portion and the L portion, thus having an effect similar to that of the recording pit formed. As the height difference H1 formed previously disappears when the P portion is illuminated by the irradiation beam intensity B, the recording and erasing operations can be effected by the change in irradiation intensity.

TP=T1A×T2A

TL=T1B×T2B where the entire transmission index of the recording layer 17 of the P portion and the L portion is made respectively TP and TL.

When $$T1A \times T2A = T1B \times T2B \tag{1}$$

the recording, reproducing and erasing operations of the focusing point recording layer can be effected as the crosstalk from the other recording layer where the reproducing operation is not being effected hardly occurs in that the diffraction beams except for the 0 order are not caused, and the transmission beams do not notice the height difference H1.

Fourth Embodiment of Disk Construction

A construction capable of effecting recording and erasing operations with reference to a dielectric is described hereinafter. As the construction is similar to the previous embodiment described in FIG. 5a, description will be effected with use of FIG. 5a. Two layers in proximity to layers 15a–15b and 16a–16b where the refractive index changes by the difference in irradiation beam intensity are provided as recording layers 17a and 17b. Assume that the refractive index of the first layer 15a–15b is N1A, and the refractive index of the second layer 16a–16b is N2A with respect to the irradiation beam intensity A in the present embodiment, the first layer 15a–15b and the second layer 16a–16b are N1B and N2B in refractive index with respect to the other irradiation beam intensity B. When an irradiation operation is effected upon a P portion with irradiation beam intensity A, upon a L portion with irradiation beam intensity B by a disk of such construction, the first and second layers 15, 16 of the P portion becomes N1A, N2A in refractive index, and the first and second layers 15a–15b and 16a–16b of the L portion become N1B and N2B in refractive index. If the reflection index with respect to the optical irradiation beam intensity A and B in the boundaries S1 and S2 are made R1A and R2A, R1B, R2B, they are determined by the refractive index and the thickness on both the sides of the boundaries S1, S2, and S3. If the relationship among R1A, R2A, R1B, and R2B is R1A>R2A, R1B<R2B as in the embodiment 3, recording and erasing operations of the recording pits can be effected with a pair of R1A and R2B.

The transmission beam path length OPP and OPL of the P portion and the L portion about the transmission beam is as follows:

OPP=N1A×H1+N2A×H2

OPL=N1B×H1+N2B×H2

$$OPP = OPL \tag{2}$$

Namely, the difference in the change in phase of both is not caused, because the optical path length of the transmission beams between the P portion and the L portion of the recording layer 17a–17b becomes equal if the conditions are made the same as those shown in 1 equation.

$$N1A \times H1 + N2A \times H2 = N1B \times H1 + N2B \times H2 \quad (1)$$

As the transmission beams do not notice the height difference h between the boundaries S1 and S2 as in the third embodiment, the ±primary diffraction beams caused by a pit to be formed here do not occur.

If the refractive index N2A in the irradiation beam intensity A of the second layer 16a–16b of the P portion and the refractive index N1B in the irradiation beam intensity B of the first layer 15a–15b of the L portion are made equal to the refractive index of the transparent zone 12a–12c, the boundary 3 between the second layer 16a–16b and the transparent zone 12a–12c of the p portion and the boundary S1 between the first layer of and the transparent zone 12a–12c of the L portion optically disappear. The reflection beams by the boundary S3 of the P portion transmission beams TP and the reflection beams R1B by the L portion boundary S1 disappear. Noise components disappear, thus allowing better reproduction signals to be obtained.

Figure 5B:
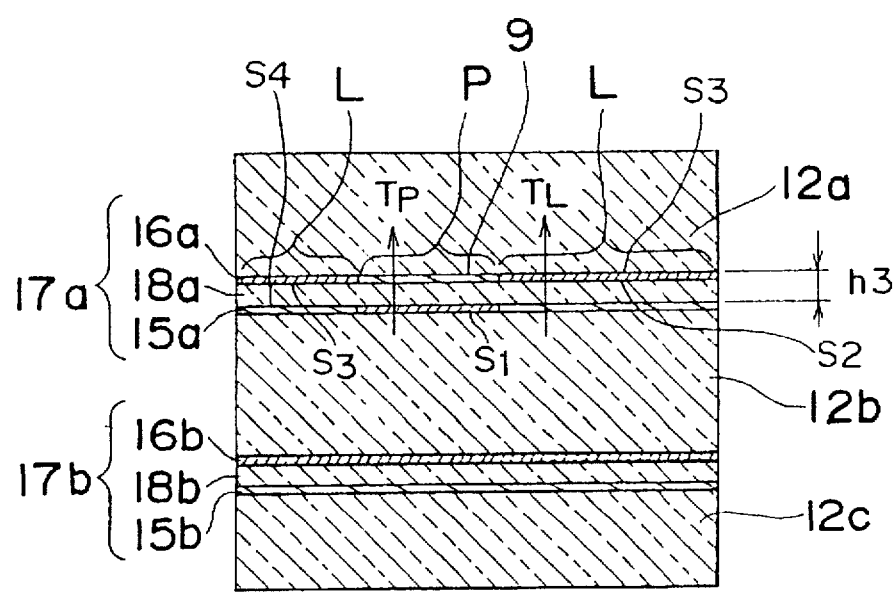
Figure 5C:
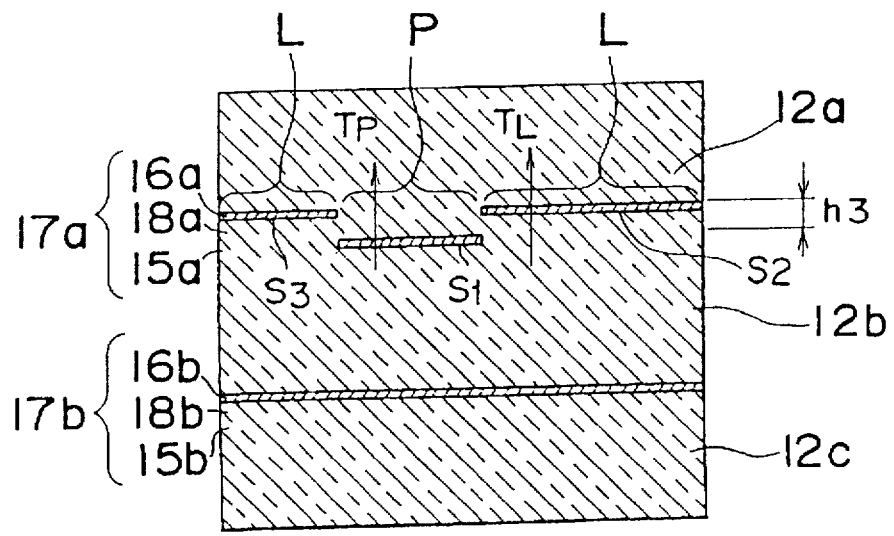
FIGS. 5c and 5d are sectional views of another embodiment of a recording and erasing optical disk of the present invention.
Figure 5D:
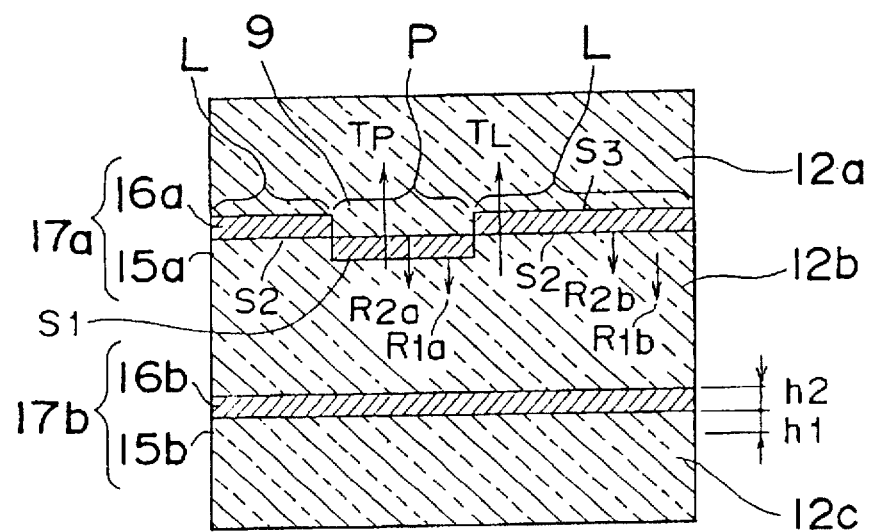

The disk construction of this embodiment is designed physically as shown by FIG. 5d, wherein only either one of the recording layers 15a–15b and 16a–16b is different in refractive index from the transparent body 12a–12c. During reproducing, at the area of P portion the optical beam 8 is reflected by the boundary plane S1, while at the area of L portion the optical beam 8 is reflected by the boundary planes S2 of the first layer 15a–15b and second layer 16a–16b. The optical disk of the present invention is constructed in such a manner that the refractive index of the second layer 16a–16b with respect to the disk irradiation beam intensity B with the refractive index of the first layer 15a–15b with respect to the disk irradiation beam intensity A is different from that of the transparent body 12a–12c, and the refractive index of the first layer 15a–15b with respect to the disk irradiation beam intensity B with the refractive index of the second layer 16a–16b with respect to the disk irradiation beam intensity A is equal to the value of that of the transparent body 12a–12c.

Fifth embodiment of disk construction

FIG. 5b illustrates the construction of another embodiment. The present embodiment is characterized by providing of an intermediate transparent body 18a–18b composed of a transparent material between the first layer 15a–15b and the second layer 16a–16b in the embodiment of FIG. 5b, which is different from the embodiment of FIG. 5a. Assume that the transmission index of the first, second layers 15a–15b change as in FIG. 5a by the difference in the irradiation beam intensity and the optical characteristics of the intermediate transparent body 18a–18b does not change. In the present invention, make the reflection in the P portion large in the boundary S1 between the transparent body 12a–12c and the first layer 15a–15b, and the boundary S3 between the intermediate transparent body 18a–18b and the second layer 16a–16b large in the L portion. In this manner, the recording pit 9 of the height difference H3 can be formed. In the present invention, the mutual dependency between the depth of the recording pit 9 and 10 the thickness of the first and second recording layers 15a–15b and 16a–16b can be removed by the provision of the intermediate transparent body 18a–18b so that the freedom in the setting of the depth of the recording pit 9 and the thickness of the first and second reproducing layers 15a–15b and 16a–16b can be increased. When the recording pit 9 is formed using the transmission index difference, the conditions of the transmission index of the first and second layers 15a–15b and 16a–16b become a (1) type. When the first and second layers 15a–15b and 16a–16b are constructed using the dielectric, the conditions become a (2) type. If the refractive index N2A of the second layer 16a–16b of the P portion in FIG. 5b and the refractive index N1B of the first layer 15a–15b of the L portion are made equal to the refractive index of the transparent zone 12a–12c and the intermediate transparent zone 18a–18b as in the embodiment of the FIG. 5d, the second layer 16a–16b of the P portion and the boundary S3 and S2 between the transparent zone 12a–12c and the intermediate transparent zone 18a–18b, the first layer of the L portion and the boundary S1 and S4 between the transparent zone 12a–12c and the intermediate transparent zone 18a–18b disappear optically as shown in FIG. 5c, and thus the reflection beams with those portions disappear so that a better reproducing signal can be obtained.

The disk construction of this embodiment is designed physically as shown by FIG. 5c, wherein only either one of the recording layers 15a–15b and 16a–16b is different in refractive indexes from the transparent body 12a–12c and the intermediate transparent body 18a–18b. During reproducing, at the area of P portion the optical beams 8 is reflected by the boundary plane S1, while at the area of L portion the optical beams 8 is reflected by the boundary planes S2. The optical disk of the present invention is constructed in such a manner that the refractive index of the second layer 16a–16b with respect to the disk irradiation beam intensity B with the refractive index of the first layer 15a–15b with respect to the disk irradiation beam intensity A is different from those of the transparent body 12a–12c and the intermediate transparent body 18a–18b, and the refractive index of the first layer 15a–15b with respect to the disk irradiation beam intensity B with the refractive index of the second layer 16a–16b with respect to the disk irradiation beam intensity A is equal to the values of those of the transparent body 12a–12c and the intermediate transparent body 18a–18b.

Figure 6:
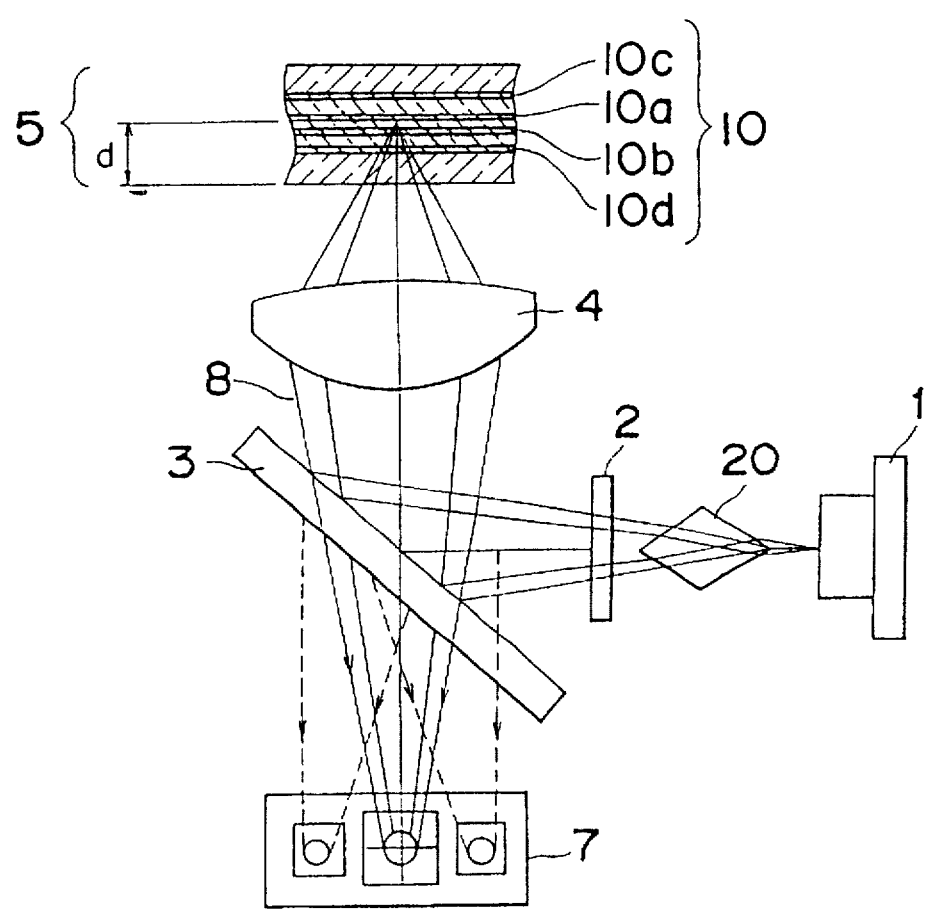
FIG. 6 is a view of an embodiment of an optical disk apparatus for effecting beam converting in accordance with the present invention.

The present invention will be described hereinafter in relation with the performance of the objective lens 4. As the lamination interval of the recording layer 10 is wider in the disk construction of the present invention, the signal mixture from the other recording layer 10 becomes advantageously less. But the disk thickness seen from the objective lens shown in FIG. 1, namely, the depth d from the disk surface to the focusing point changes by the difference of the focusing recording layer 10. The objective lens 4 is designed in accordance with a certain disk thickness (approximately 1.2 mm). It exhibits sufficiently satisfactory performance at this thickness. When the disk thickness d changes, which causes a problem that the optical beams 8 cannot be sufficiently focused. It makes spherical aberration larger. If the spherical aberration can be restrained, the focusing deterioration can be prevented. The spherical aberration is mainly caused by the difference in the optical path length of the optical beams passing through the optical axis central portion of the optical beams 8 and its surrounding portion. The optical path length difference of the optical system to be composed of an objective lens 4 and a disk 5 within the ring area is considerably reduced if the optical beams 8 are made, for example, ring shaped so as to pass the optical beams into only the surrounding portion by using an optical beam converting means 20 with a prism as shown in, for example, FIG. 6 or the optical quantity of the surrounding portion is made larger, thus improving the focusing. As the method is a super resolving method, shorter diameter of the focusing spot can be made at the same time.

Figure 7:
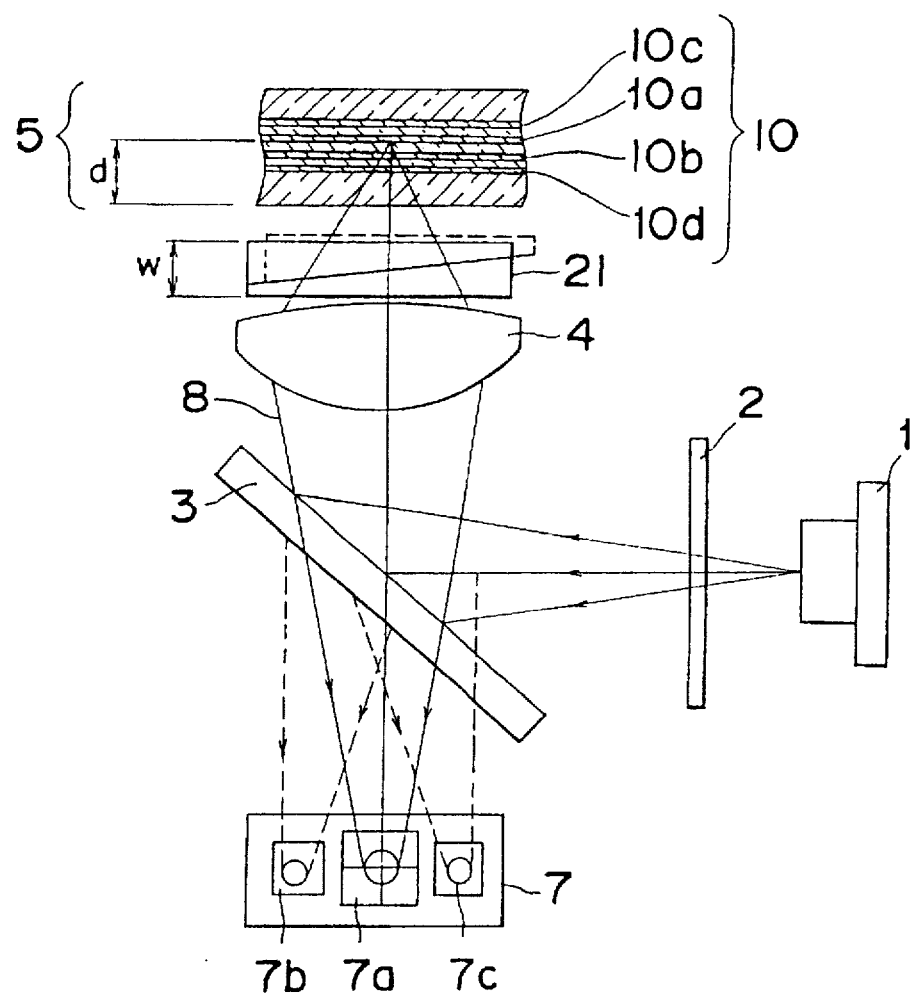
FIG. 7 is a view of an embodiment of optical path an optical disk apparatus for effecting an length correction in accordance with the present invention.
Figure 8:
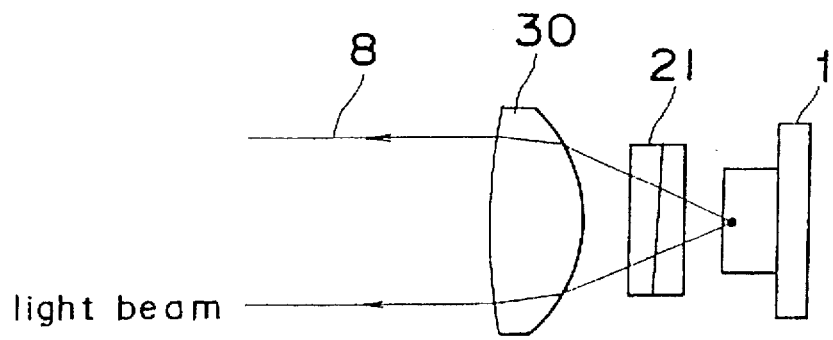
FIG. 8 is a view of another embodiment of an optical path length changing means.

An optical path length changing means 21 shown in FIG. 7 can be used as another method. The optical path length changing means 21 is so constructed that it is inserted, for example, between the objective lens 4 and the disk 5 and an oblique face side of wedge shaped two glasses of equal refractive index are opposed. As the thickness w of the optical path length changing means 21 can be changed by the movement of one glass along the oblique face, the change in the disk thickness d accompanied by change in the focusing recording layer can be corrected, so that the focusing of the objective lens 4 can be prevented from being deteriorated. The optical path length changing means 21 may be placed anywhere if the optical beams are non-parallel. It is not restricted to being placed between the objective lens 4 and the disk 5. It may be placed between the semiconductor laser 1 and the objective lens 4. A similar effect can be obtained even if it is located between the semiconductor laser 1 and a collimator 30 in an optical system where the irradiation beams of the semiconductor laser 1 are made parallel or approximately parallel using the collimator lens 30 as shown in FIG. 8.

Figure 9:
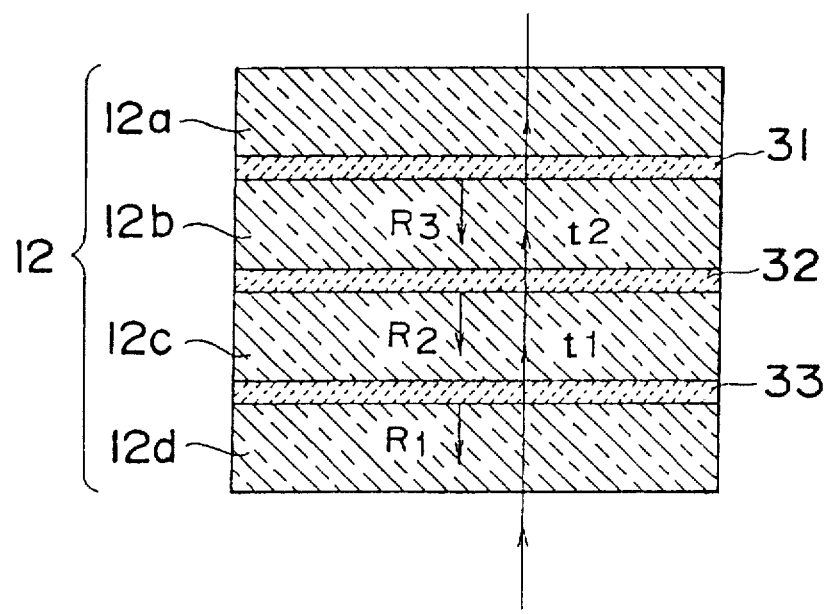
FIG. 9 is a beam transmission and reflection view in a multi-layer recording layer.

The setting of the reflection index of the respective recording layer 10 is described hereinafter referring to FIG. 9.

Assume that the optical beams 8 become incident from below with respect to the optical disk and layers 31, 32, and 33 are numbered in order from the optical beam incident side to the recording layers. As the irradiation optical amount t1 is reduced by the reflection R1 in the first recording layer 31 and the absorption portion, in the second recording layer 32, the reflection optical amount R2 here is reduced accordingly and the optical amount to be returned to the optical detector 7 is also reduced. As the number of the layers such as third layer, fourth layer increases, the reduction amount becomes larger. Since the optical amount reduction is caused even by the optical transmission of the other recording layer in the process of returning to the optical detector 7 after the reflection of the recording layer, the optical detector returning optical amount is further reduced as the recording layer is farther from the laser beam source. In order to prevent it, the reflection index has only to be made larger as the recording layer is farther from the laser beam source 1.

Figure 10:
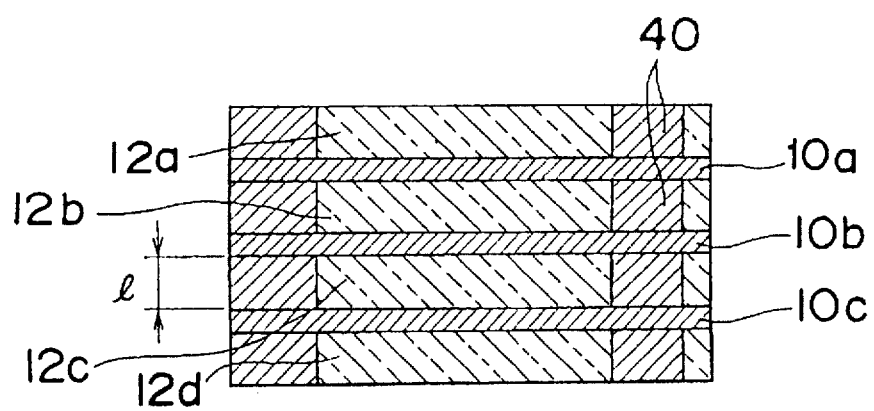
FIGS. 10, 11a and 11b are construction views of the spacer layout of an optical disk of the present invention.
Figures 11A, 11B:
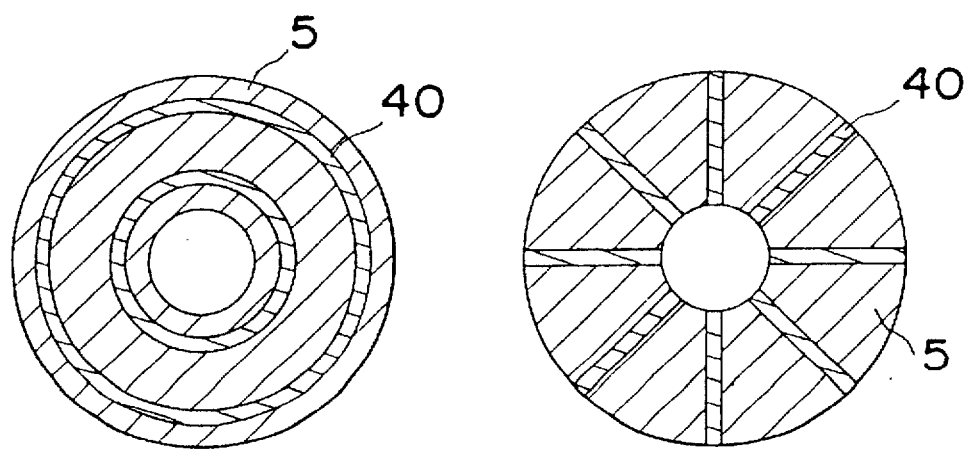

A method of manufacturing an optical disk will be described hereinafter. It is desired that the optical disk of the present invention be made by alternate lamination of the recording layer 10 and the transparent body 12, the interval Z between the recording layers 10 be as relatively thin as approximately 10 μm through approximately several hundreds pm and the interval be constant as much as possible. Therefore, it is important that the thickness of the transparent body 12 is made uniformly. A spacer 40 which is strictly regulated in thickness between the recording layers 10a–10c is as shown in FIG. 10 so as to regulate the interval z of the recording layer 10a–10c with the thickness of the spacer 40. Thereafter, an optical disk is made by a method of pouring and hardening the transparent body 12a–12d or other methods. A radiation or concentric shape is provided as in, for example, FIGS. 11a–11b as an arrangement of the spacer 40.

As a method of regulating the interval L among the recording layers 10, a transparent body can be formed by a so-called spin coating method comprising the steps of dropping liquid resin onto the recording layers and thereafter rotating the optical disk, thereby uniformly applying the resin thinly.

Figure 12:
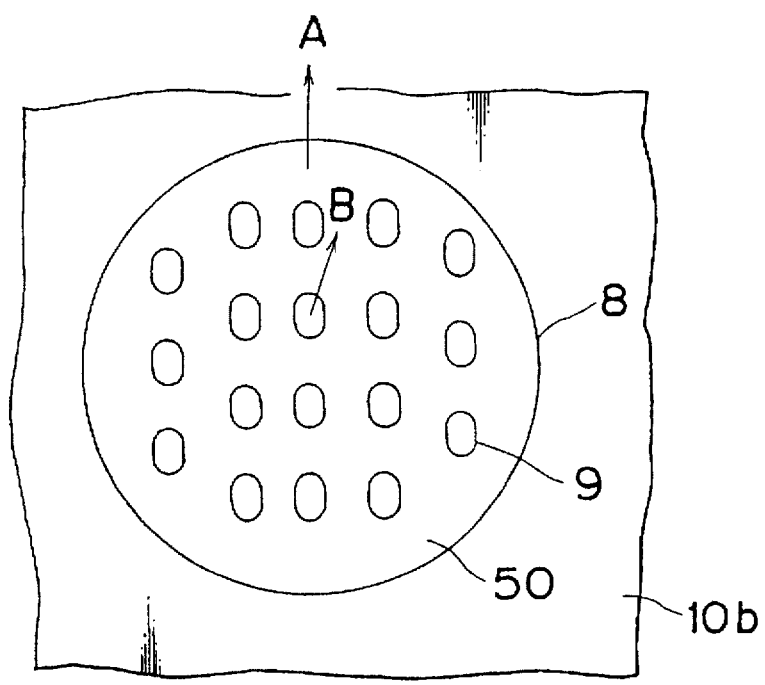
FIG. 12 is a view of a magneto-optical recording pit.

A case where an optical magnetic material using the magnetic optical effect is used in the recording layers is described hereinafter using FIG. 12. Assume that the optical beams 8 which become incident to the non-focusing recording layer 10b are polarized in an A direction in the drawing when the optical beams 8 are irradiated upon the non-focusing recording layer 10b, the polarization direction is changed in rotation in the B direction of the drawing in the recording pit 9 portion although the polarization direction of the transmission means of the non-recorded portion 50 remains unchanged as the A direction is. The difference between the recording pit 9 portion and the non-recorded portion 50 is in the polarization direction only, and the difference between the amplitude and the phase of the optical beams 8 are not in both so that the optical diffraction is not caused. The reflection beams have changes in the polarization direction of the recording pit 9 portion as in the transmission beams and the optical diffraction is not caused. The polarization direction changes as the entire transmission, reflection beams, which are determined by the area ratio of the recording pit 9 portion and the non-recorded portion 50, and the irradiation beam intensity distribution. Assume that the interval between the recording layers 10 is provided large and the number of the recording pits 9 on the non-focus recording layer 10b to be irradiated by the optical beams 8 is sufficiently provided, and the influences with respect to the polarization direction of the entire optical beams 8 are averaged by the recording pit 9 so that the polarization direction thereof is normally considered constant actually, because the number of pits is many as described previously. The polarization direction of the entire optical beams are directed at a particular direction located between the polarization direction of the recording portion and the polarization direction of the non-recording portion 50. As the reproducing signal is determined by the change in the entire optical beams 8, the constant change in the polarization direction of the entire optical beams 8 has DC components provided on the reproducing signal, which does not cause a problem without giving influences to the reproducing signal. Since diffraction is caused by the transmission and reflection of the non-focusing recording layer 10b if the interval between the recording layers 10 is made larger sufficiently with respect to the wavelength or the pit size as in the previous invention embodiment in the case of the magneto-optical recording layer, the influences of the non-recording reproducing layer upon the reproducing signal can be reduced, and the multi-layer recording and reproducing operations can be effected.

Figure 13:
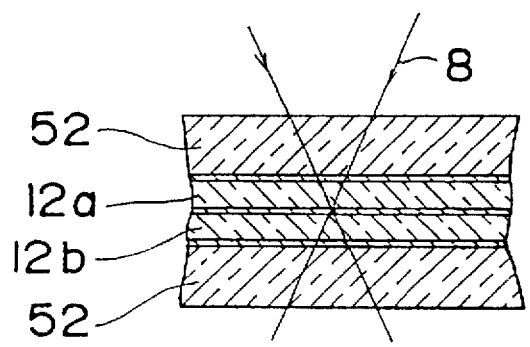
FIG. 13 is a view of a recording layer and a phase change recording phase of the present invention.

The construction of the multi-layer beam disk by the mixed lamination of the recording layer of the present invention and the conventional recording layer is described hereinafter with reference to FIG. 13. When the recording layer of the conventional construction, namely, a recording layer for generating high order transmission diffraction beams is added to the multi-layer recording layer of the present invention described previously, high order transmission beams are normally generated in the recording layer of the conventional construction and become interference signals with respect to the reproducing signals. As the transmission beams of the conventional recording layer does not cause bad influences if the recording layer of the construction of the present invention is disposed on the incident side of the optical means 8 and the conventional recording layer is disposed on the transmission side of the optical beams 8, both can coexist before the use thereof. The conventional recording layers can be used by one layer. A phase change recording layer or the like using the condition change among amorphous—crystals can be used as the conventional recording layer.

Figure 14A:
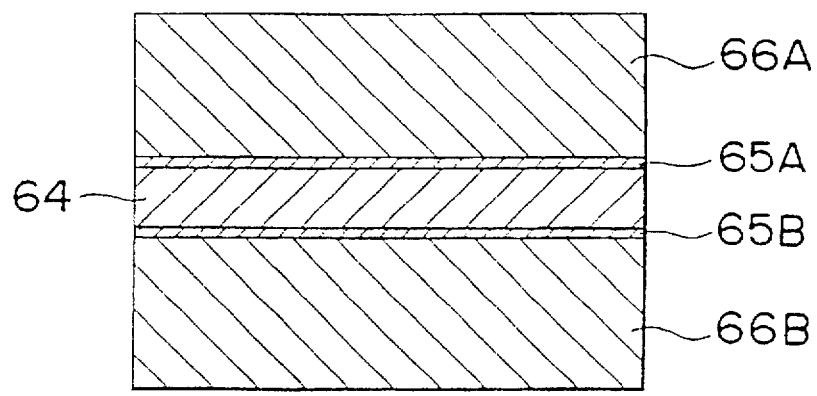
FIGS. 14a to 14c are sectional views of an embodiment of an optical disk having two layers joined together.
Figure 14B:
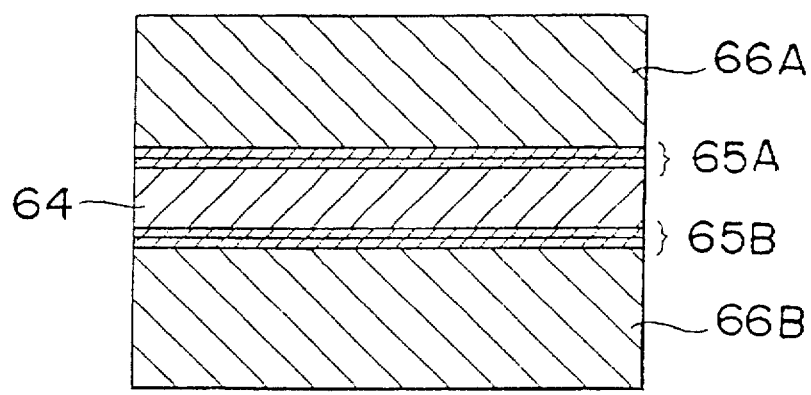
Figure 14C:
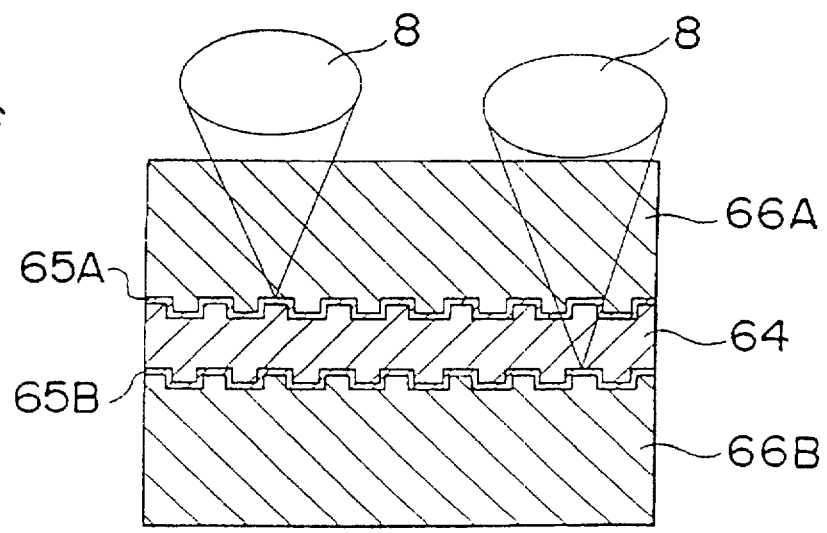
Figure 15:
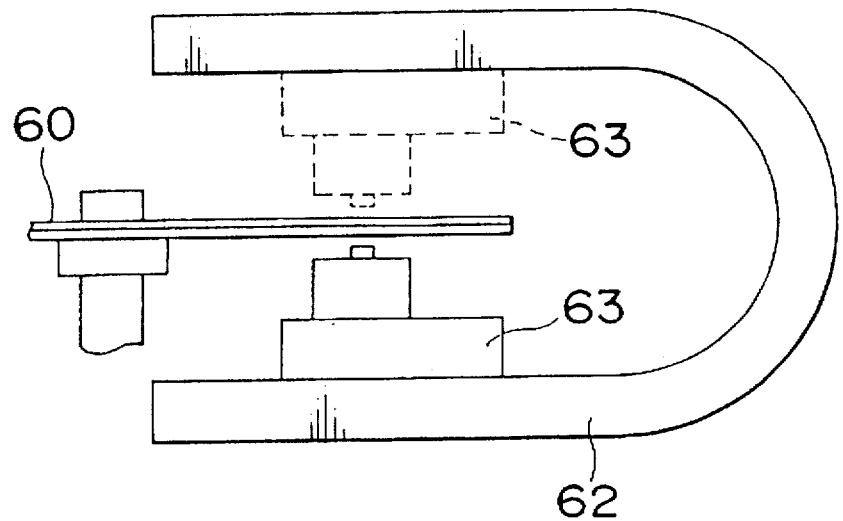
FIG. 15 is a schematic construction view of the disk of FIGS. 14a–14c.
Figure 16:
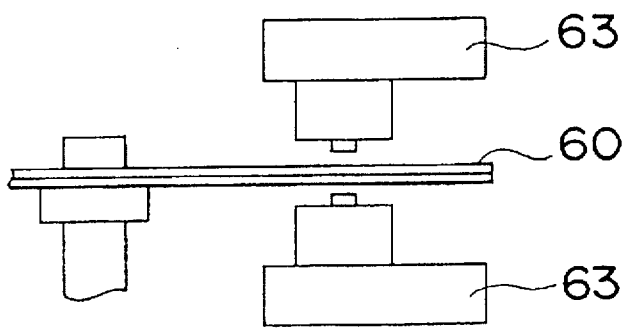
FIG. 16 is a view of head located on both sides of the disk.
Figure 17:
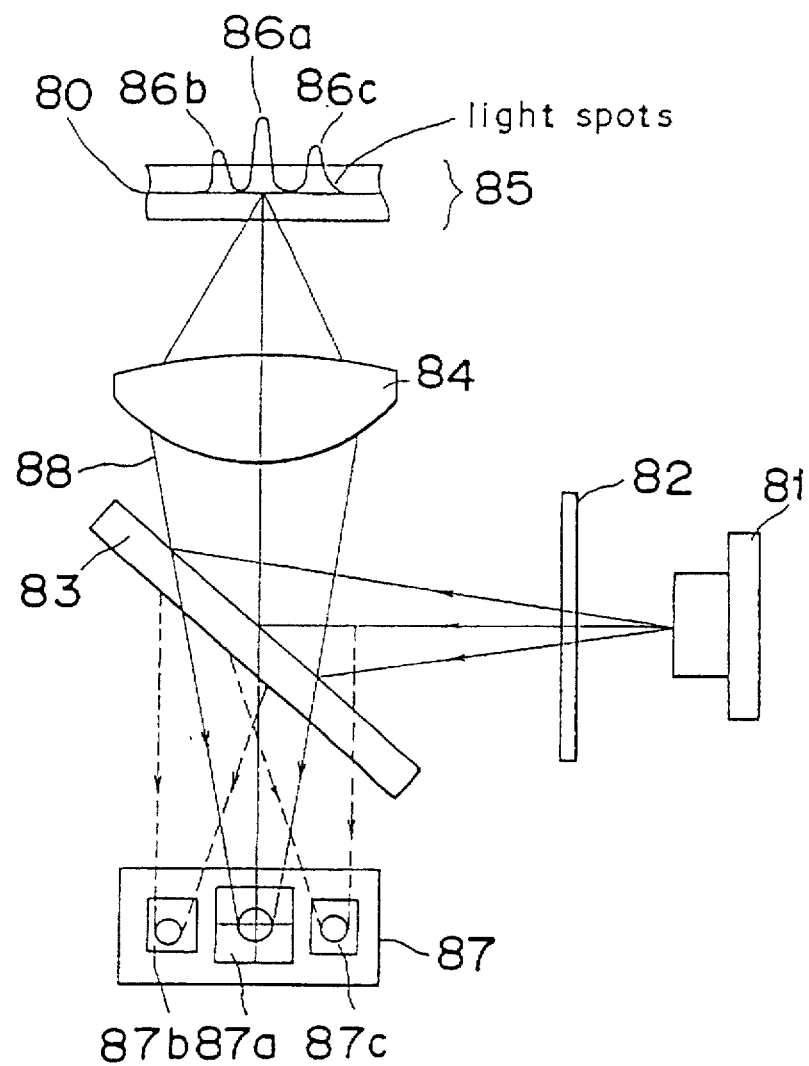
FIG. 17 is a view of a conventional optical disk apparatus.

Next, as shown by FIG. 14a the recording layer is respectively provided at one side of the one side type disks 66A and 66B which are adhered to provide one disk 60 of two sides type having two planes of the recording layers opposite to each other, and the reproducing of the two sides type disk will be explained hereinafter. In conventional, since it needs to irradiate the optical beams 8 from the side of B of the basic member 66 at the time of reproducing the recording layer 65B, it is necessary to provide an operation for reversing the disk in order to reproduce the other side of the recording layer after reproducing one side of the recording layer. Therefore, it is employed a process for transferring the optical head 63 to both planes of the disk 60 upon providing the separate guide 62 as shown in FIG. 15, or a method for providing the optical head onto the both sides of the disk 60, as shown in FIG. 16. On the contrary, the multi-layers disk of the present invention can be reproduced even if the optical beams are passing through the recording layer on the way, and can be reproduced the recording layer 65B even when the optical beams 8 is irradiated from the upper side of FIG. 14a in the drawing. Accordingly, with the above constructed multi-layers disk of the present invention it becomes possible to reproduce the both sides of disk without making the reverse operation of the disk which is necessary in a conventional disk, and it is not necessary to provide both sides with a positioning head and the head moving mechanism of conventional apparatus as shown in FIGS. 15 and 16. In connection with the disk of the present invention, FIG. 14a shows a disk construction where the recording pits are formed by providing concave and convex areas on the recording layer, FIG. 14b shows a disk construction where the recording layers are designed as a two layer construction, and FIG. 14c shows a view of construction employing optical-magnetic materials for the recording layer. With each of embodiments shown in FIG. 14a–14c, the refractive index of joint member 64 and basic members 66A and 66B is designed to be equal to each other in order to present from the transparent light of high order.

As is clear from the foregoing description, according to the arrangement of the present invention, the lamination of the recording layers can be effected, thus improving the remarkable recording density, because the signal mixture from the recording layers which do not become an object of the recording and reproducing can be reduced.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical recording/reproducing apparatus comprising:

a beam source for producing an optical beam;

a pair of one-sided type disks each having at least one recording layer and at least one transparent body, wherein the at least one recording layer and at least one transparent body are alternately laminated, wherein each recording layer includes pit portions and non-pit portions, wherein transmission indices of pit portions are approximately equal to those of non-pit portions, wherein said pair of one-sided type disks are adhered to each other with a joint member interposed therebetween so that the recording layers of each of said one-sided type disks face each other to thereby provide a two-sided type disk, wherein refractive indices of said pair of one-sided type disks are approximately equal to those of said joint member, and wherein the recording layers of each of said one-sided type disks can be reproduced by an irradiation of the optical beam incident on one side of said two-sided type disk;

wherein each recording layer is composed of a first layer and a second layer, wherein said first and second layers respectively have transmission indices of T1A and T2A with respect to the optical beam when the optical beam has a disk irradiation intensity A, wherein said first and second layers respectively have transmission indices of T1B and T2B with respect to the optical beam when the optical beam has a disk irradiation intensity B such that:

$$T1A \times T2A = T1B \times T2B$$

and wherein an interval between each of the recording layers is at least 10 times as long as a wavelength of the optical beam;

an objective lens for focusing the optical beam produced by said beam source onto said two-sided type disk; and a detector for receiving beams reflected from said two-sided type disk and for detecting information recorded on said two-sided type disk.

2. An optical recording/reproducing apparatus as in claim 1, wherein each of the recording layers are made of optical-magnetic materials.

3. An optical recording/reproducing apparatus comprising:

a beam source for producing an optical beam;

a pair of one-sided type disks each having at least one recording layer and at least one transparent body, wherein the at least one recording layer and at least one transparent body are alternately laminated, wherein each recording layer includes pit portions and non-pit portions, wherein transmission indices of pit portions are approximately equal to those of non-pit portions, wherein said pair of one-sided type disks are adhered to each other with a joint member interposed therebetween so that the recording layers of each of said one-sided type disks face each other to thereby provide a two-sided type disk, wherein refractive indices of said pair of one-sided type disks are approximately equal to those of said joint member, and wherein the recording layers of each of said one-sided type disks can be reproduced by an irradiation of the optical beam incident on one side of said two-sided type disk;

wherein each recording layer comprises an intermediate transparent body disposed between first and second layers and wherein said first and second layers are alternately laminated, wherein transmission indices of said first and second layers are respectively T1A and T2A with respect to the optical beam when the optical beam has a disk irradiation intensity A, wherein transmission indices of said first and second layers are respectively T1B and T2B with respect to the optical beam when the optical beam has a disk irradiation intensity B such that:

$$T1A \times T2A = T1B \times T2B$$

wherein said intermediate transparent body and said transparent body are approximately equal in refractive indices, and wherein an interval between each of the recording layers is at least 10 times as long as a wavelength of the optical beam;

an objective lens for focusing the optical beam produced by said beam source onto said two-sided type disk; and a detector for receiving beams reflected from said two-sided type disk and for detecting information recorded on said two-sided type disk.

4. An optical recording/reproducing apparatus as in claim 3, wherein each of the recording layers are made of optical-magnetic materials.

5. An optical recording/reproducing apparatus comprising:

a beam source for producing an optical beam;

a pair of one-sided type disks each having at least one recording layer and at least one transparent body, wherein the at least one recording layer and at least one transparent body are alternately laminated, wherein each recording layer includes pit portions and non-pit portions, wherein transmission indices of pit portions are approximately equal to those of non-pit portions, wherein said pair of one-sided type disks are adhered to each other with a joint member interposed therebetween so that the recording layers of each of said one-sided type disks face each other to thereby provide a two-sided type disk, wherein refractive indices of said pair of one-sided type disks are approximately equal to those of said joint member, and wherein the recording layers of each of said one-sided type disks can be reproduced by an irradiation of the optical beam incident on one side of said two-sided type disk;

wherein each recording layer is composed of a first layer and a second layer having respective thicknesses of H1 and H2, having respective refractive indices of N1A and N2A with respect to the optical beam when the optical beam has a disk irradiation intensity A, and having respective refractive indices of N1B and N2B with respect to the optical beam when the optical beam has a disk irradiation intensity B such that:

$$N1A \times H1 + N2A \times H2 = N1B \times H1 + N2B \times H2$$

wherein an interval between each of the recording layers is at least 10 times as long as the wavelength of the optical beam;

an objective lens for focusing the optical beam produced by said beam source onto said two-sided type disk; and a detector for receiving beams reflected from said two-sided type disk and for detecting information recorded on said two-sided type disk.

6. An optical recording/reproducing apparatus as in claim 5, wherein each of the recording layers are made of optical-magnetic materials.

7. An optical recording/reproducing apparatus comprising:

a beam source for producing an optical beam;

a pair of one-sided type disks each having at least one recording layer and at least one transparent body, wherein the at least one recording layer and at least one transparent body are alternately laminated, wherein each recording layer includes pit portions and non-pit portions, wherein transmission indices of pit portions are approximately equal to those of non-pit portions, wherein said pair of one-sided type disks are adhered to each other with a joint member interposed therebetween so that the recording layers of each of said one-sided type disks face each other to thereby provide a two-sided type disk, wherein refractive indices of said pair of one-sided type disks are approximately equal to those of said joint member, and wherein the recording layers of each of said one-sided type disks can be reproduced by an irradiation of the optical beam incident on one side of said two-sided type disk;

wherein each recording layer comprises an intermediate transparent body disposed between first and second layers, wherein said first and second layers are alternately laminated, said first and second layers having respective thicknesses of H1 and H2, and having respective refractive indices of N1A and N2A with respect to the optical beam when the optical beam has a disk irradiation intensity A and having respective refractive indices of N1B and N2B with respect to the optical beam when the optical beam has a disk irradiation intensity B such that:

$$N1A \times H1 + N2A \times H2 = N1B \times H1 + N2B \times H2$$

wherein said intermediate transparent body and said transparent body are approximately equal in refractive indices, and wherein an interval between each of the recording layers is at least 10 times as long as the wavelength of the optical beam;

an objective lens for focusing the optical beam produced by said beam source onto said two-sided type disk; and a detector for receiving beams reflected from said two-sided type disk and for detecting information recorded on said two-sided type disk.

8. An optical recording/reproducing apparatus as in claim 7, wherein each of the recording layers are made of optical-magnetic materials.

\* \* \* \* \*